US012240284B2

(12) United States Patent
Stewart et al.

(10) Patent No.: US 12,240,284 B2
(45) Date of Patent: Mar. 4, 2025

(54) HIGH STROKE EFFICIENCY HYDRAULIC BUMP STOP

(71) Applicant: Fox Factory, Inc., Duluth, GA (US)

(72) Inventors: Matthew Stewart, Buford, GA (US); Ola Christopher Nilsson, Flowery Branch, GA (US)

(73) Assignee: Fox Factory, Inc., Duluth, GA (US)

( * ) Notice: Subject to any disclaimer, the term of this patent is extended or adjusted under 35 U.S.C. 154(b) by 371 days.

(21) Appl. No.: 17/868,355

(22) Filed: Jul. 19, 2022

(65) Prior Publication Data

US 2023/0021701 A1    Jan. 26, 2023

Related U.S. Application Data

(60) Provisional application No. 63/224,254, filed on Jul. 21, 2021.

(51) Int. Cl.
  *B60G 15/06* (2006.01)
  *B60G 17/08* (2006.01)

(52) U.S. Cl.
  CPC ........... *B60G 15/061* (2013.01); *B60G 17/08* (2013.01); *B60G 2202/30* (2013.01); *B60G 2204/45* (2013.01); *B60G 2206/41* (2013.01); *B60G 2500/11* (2013.01); *B60G 2800/162* (2013.01)

(58) Field of Classification Search
  CPC .. B60G 15/061; B60G 17/08; B60G 2202/30; B60G 2204/45; B60G 2206/41; B60G 2500/11; B60G 2800/162; B60G 2300/07
  See application file for complete search history.

(56) References Cited

U.S. PATENT DOCUMENTS

| 3,111,201 | A  | * | 11/1963 | Bliven  | F16F 9/486 188/289 |
| 7,140,601 | B2 | * | 11/2006 | Nesbitt | F16F 9/3214 188/269 |
| 7,374,028 | B2 | * | 5/2008  | Fox     | F16F 9/512 188/322.15 |
| 8,132,654 | B2 | * | 3/2012  | Widla   | F16F 9/516 188/315 |
| 2013/0228404 | A1 | * | 9/2013  | Marking | F16F 9/19 188/266.2 |
| 2020/0231245 | A1 | * | 7/2020  | Lynch   | B62K 25/286 |
| 2023/0027763 | A1 | * | 1/2023  | Stewart | F16F 9/065 |

OTHER PUBLICATIONS

Chinese Patent No. CN 103502679 to Keil et al published on Jan. 8, 2014.*
Canadian Patent No. CA 2881087 to Batsch et al published on Feb. 13, 2014.*

* cited by examiner

*Primary Examiner* — Pamela Rodriguez

(57) ABSTRACT

Disclosed herein is a hydraulic jounce bouncer comprising a damper body, a shaft telescopically engaged with the damper body, a piston slidably disposed within the damper body and threadedly coupled to a first end of the shaft, wherein the piston has at least one compression port therethrough, and a negative spring disposed between the shaft and the damper body.

17 Claims, 3 Drawing Sheets

HIGH STROKE EFFICIENCY HYDRAULIC BUMP STOP

CROSS-REFERENCE TO RELATED APPLICATIONS (PROVISIONAL

This application claims priority to and the benefit of U.S. Provisional Patent Application No. 63/224,254 filed on Jul. 21, 2021, entitled "HYDRAULIC JOUNCE BOUNCER" by Matthew Stewart, and assigned to the assignee of the present application, the disclosure of which is hereby incorporated by reference in its entirety.

BACKGROUND ART

In bike and vehicular suspension a bump stop, jounce bumper, or jounce bouncer, is used during instances of possible suspension bottoming out. When the suspension bottoms out, or is fully compressed, the suspension and even the vehicle frame can be damaged. Bottom out events can lead to a loss of vehicle control and discomfort experienced by the vehicle occupants. Bump stops act to prevent full bottoming out, and as a result protect the suspension system and frame of the vehicle or bike. This increased bottom out control contributes to increased occupant safety and comfort.

The term jounce commonly refers to the shock traveling towards bottoming out, and the term dead length is the length of the jounce bouncer or suspension that does not contribute to active damper travel.

BRIEF DESCRIPTION OF THE DRAWINGS

The accompanying drawings, which are incorporated in and form a part of this specification, illustrate embodiments of the present technology and, together with the description, serve to explain the principles of the present technology.

DETAILED DESCRIPTION OF THE EMBODIMENTS

The detailed description set forth below in connection with the appended drawings is intended as a description of various embodiments of the present invention and is not intended to represent the only embodiments in which the present invention is to be practiced. Each embodiment described in this disclosure is provided merely as an example or illustration of the present invention, and should not necessarily be construed as preferred or advantageous over other embodiments. In some instances, well known methods, procedures, and objects have not been described in detail as not to unnecessarily obscure aspects of the present disclosure.

When fitting suspension and jounce systems to a vehicle or bike, there is often a limited amount of space for the components to fit into. As a result, it is important to make the damper as compact as possible, while still retaining the functionality of non-compact embodiments.

Hydraulic Jounce Bumpers (HJB) are always a compromise between stroke and overall length. This has significant impact on mounting options and locations as well as tuning limitations. If you can decrease the dead length, you can increase the stroke for a given compressed length and greatly improve packaging efficiency.

Current HJB designs use a threaded post to allow for the use of a conventional piston which works well and is easy to assemble. However, one drawback of this design is that flow ports are made through the threaded post and interrupt the threads. Due to the threads being interrupted, thread lockers have curing issues, which can result in the thread locker material breaking off and becoming debris in the HJB. Another drawback is that the internal floating piston travel can act as a limiting factor of the overall stroke of the HJB.

Figure 1:
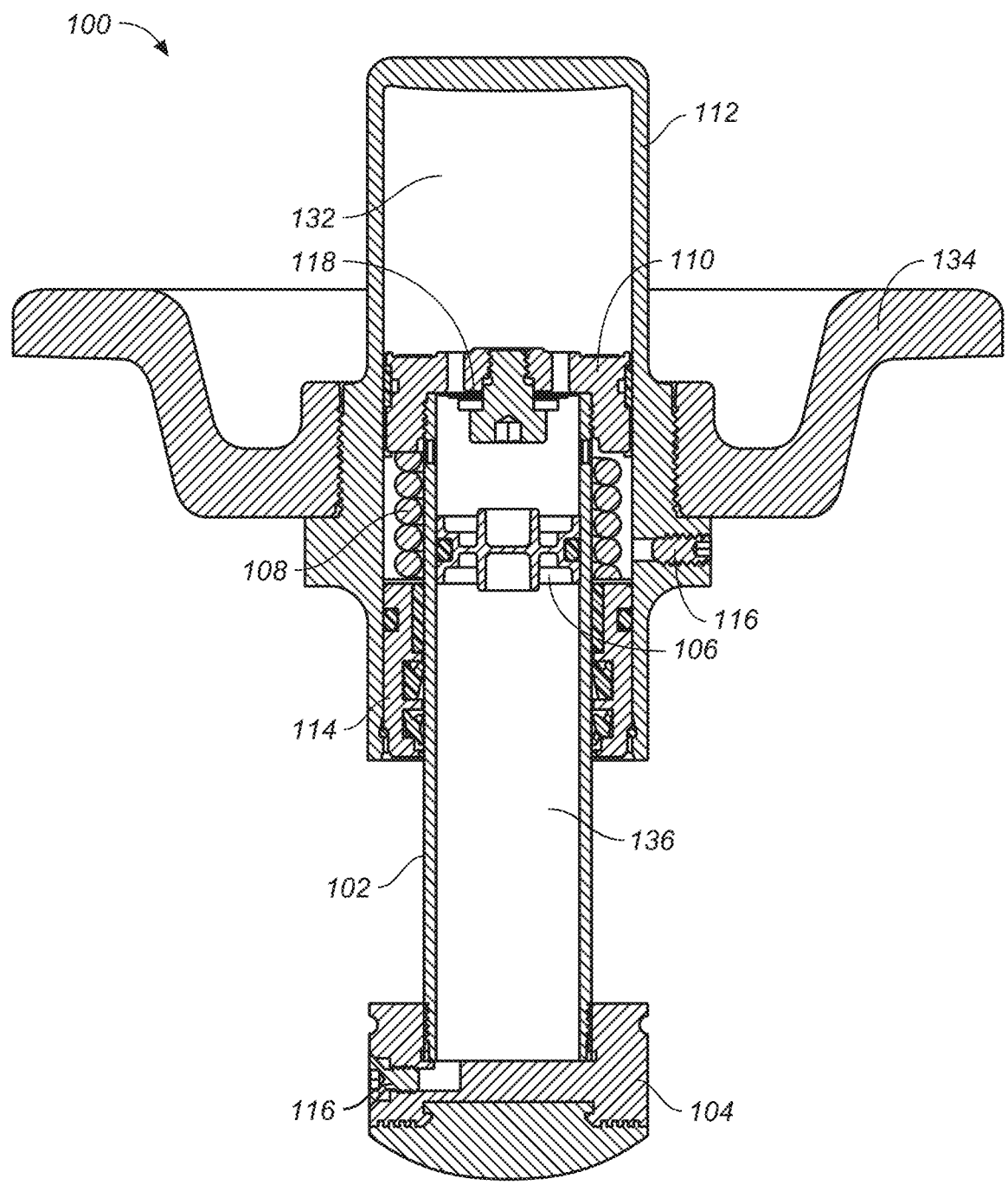
FIG. 1 shows a cross section view of hydraulic jounce bumper.

FIG. 1 shows a cross section view of hydraulic jounce bumper 100. HJB 100 is comprised of shaft 102, bottom bumper 104, internal floating piston 106, negative spring 108, piston 110, mounting bracket 134, and damper body 112. In one embodiment, negative spring 108 has fewer coils in order to reduce dead length.

Bearing housing 114 houses the bearings, seals, and similar components. Negative spring 108 is disposed between the shaft 102 and the damper body 112. Shaft 102 is telescopically engaged with damper body 112, and the piston 110 is slidably disposed within the damper body 112 and threadedly coupled to a first end of shaft 102. Bottom bumper 104 is disposed at a second end of shaft 102.

One place where dead length was eliminated was with a new placement of oil fill 116. In the present embodiment, oil fill 116 was moved from a position that extended the length of the HJB 100 and instead placed on the side. In one embodiment there is a single oil fill 116. In one embodiment, there are multiple instances oil fill 116. Dead length may also be removed from the thickness of bottom bumper 104. In one embodiment, oil fill 116 is in fluid connection rebound chamber 230.

In one embodiment, nitrogen charge 136 is in gas communication with the interior of shaft 102 through bottom bumper 104.

One major place from which dead length was removed is the piston 110. Piston 110 divides the damper body 112 into a compression chamber 132 and a rebound chamber 230. Rebound chamber 230 is fluidly connected to the interior of shaft 102. In previous inventions, the piston had check shims to control both the compression and the rebound flow. These check shims were held in place by a threaded post and nut. The head of the post would have threads to couple it to the shaft. As previously mentioned, these threads were interrupted by flow ports and would lead to thread locker breaking off lowering the efficiency of the system.

Figure 2:
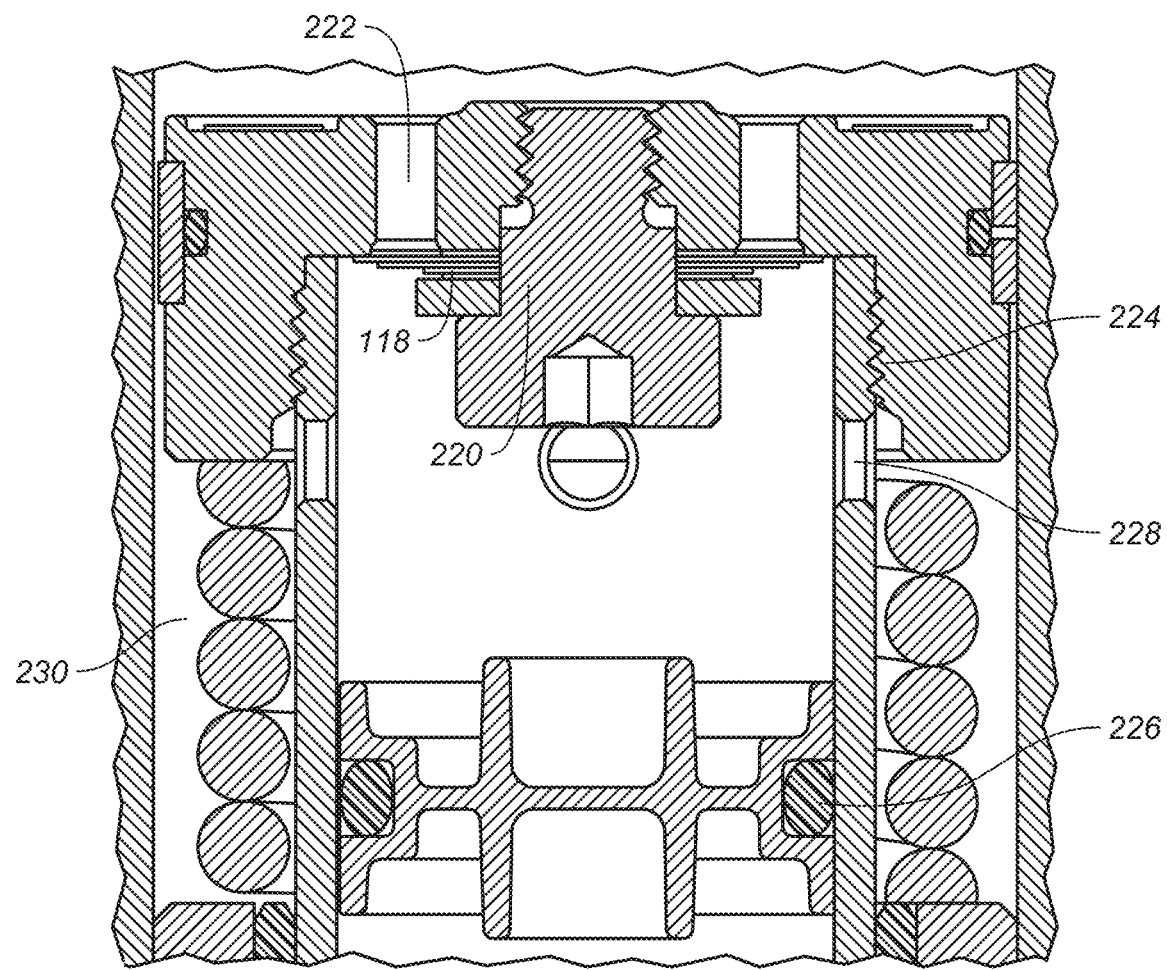
FIG. 2 shows a close-up cross section view of the piston.

In one embodiment of HJB 100, piston 110 has compression shims 118 to restrict flow through the compression ports during a compression stroke, and a single rebound check shim. FIG. 2 shows a close-up cross section view of the piston 110. In this view, compression shims 118 can be better seen, and are held in place by shoulder screw 220. Shoulder screw 220 is a blind tap fastener, which is shorter and more space efficient than the bolt fastener of previous inventions. Compression ports 222 can be seen on the plane shown, while rebound ports are not shown. This change results in lessening the dead length of the invention, and also allows for the internal floating piston 106 to have more travel.

In one embodiment, rebound ports do not have check shims, and the rebound flow is predetermined. In one embodiment, there may be multiple models of HJB where one difference is the size of the rebound ports. In this embodiment, the HJB rebound ports would be selected depending on the desired rebound rate. As such, the rebound rate would be preset, and tuning comes from selection of the desired HJB rebound ports before installation. In one embodiment, the piston may be swapped out to change the rebound or compression flowrate. In one embodiment, the rebound force is generated from the gas pressure in the compression chamber 132.

Rebound ports may be on the same plane, or a different plane than the cross section shown in FIG. 1 and FIG. 2. In one embodiment there is one rebound port. In one embodiment, there is at least one rebound port. Rebound ports may be clustered, or dispersed around piston 110. In one embodiment, rebound ports have check shims (not shown) to restrict flow through the rebound ports during a compression stroke. In this embodiment with rebound shims, there is still the same improvement in the overall dead length and in the travel distance of the internal floating piston 106. In one embodiment, a tuner or end user may choose between having the rebound flow rate controlled by check shims, or a desired bleed diameter of the rebound ports.

In one embodiment, compression ports 222 fluidly connect compression chamber 132 with the interior of shaft 102, while rebound ports fluidly connect compression chamber 132 with rebound chamber 230.

In the present embodiment, piston 110 has internal threads 224 that allow the shaft 102 to couple directly to the piston without the need for an intermediate (such as the post found in previous inventions). This change has the benefit of reducing the dead length of the invention. In other embodiments, piston 110 has external threads and the compression damping force is generated without compression shims.

Shoulder screw 220 also acts as a stop for internal floating piston 106. Without shoulder screw 220 acting as a stopper, the internal floating piston O-rings 226 would encounter shaft ports 228 and no longer properly seal.

In order to prevent hydro locking, shaft ports 228 allow fluid to flow from inside shaft 102 to rebound chamber 230.

In one embodiment, the internal components such as shaft 102, bearing housing 114, negative spring 108, piston 110, etc., can be retrofitted into legacy equipment.

One benefit of the various embodiments of the present invention is the decrease in manufacturing cost. Standard O-rings and external bearings are shown to be used throughout the invention in at least FIG. 1 in order to ensure proper functioning. For instance, the O-ring shown around internal floating piston 106, or the combination of an O-ring and external bearing around piston 110.

For the purpose of clarity an example of the change in dead length offered by embodiments of the present invention will be given. It should be understood that the numerical values given are not limiting the scope of the design. Using a 2 inch stroke as a common value (a reasonable average to one of ordinary skill int the art), previous inventions would have a fully compressed length of 7.952. In one embodiment incorporating only the new piston, the design would have a compressed length of 7.659. This results in a piston only stroke increase of 0.293 inches. As a secondary benefit, the available internal floating piston stroke is significantly increased. As the interior bore of shaft 102 is smaller than the damper body bore, the internal floating piston has to travel a relatively long distance for a given shaft displacement. This means that in previous designs the available internal floating piston travel is often a limiting factor. Using the 2 inch stroke reference once again, the internal floating piston travel is increased from 4.332 inches to 5.047 inches. This means that in an embodiment only utilizing the new piston design, the internal floating piston travel increases by 0.715 inches.

When combining the new piston 110 design with some of the other improvements (e.g. shorter bottom bumper, side oil fill, shorter negative spring), the compressed length is reduced from the 7.952 inches of previous designs to 6.399 inches of the present invention. This is an overall dead length reduction of 1.553 inches for a 2 inch stroke bump stop.

Figure 3:
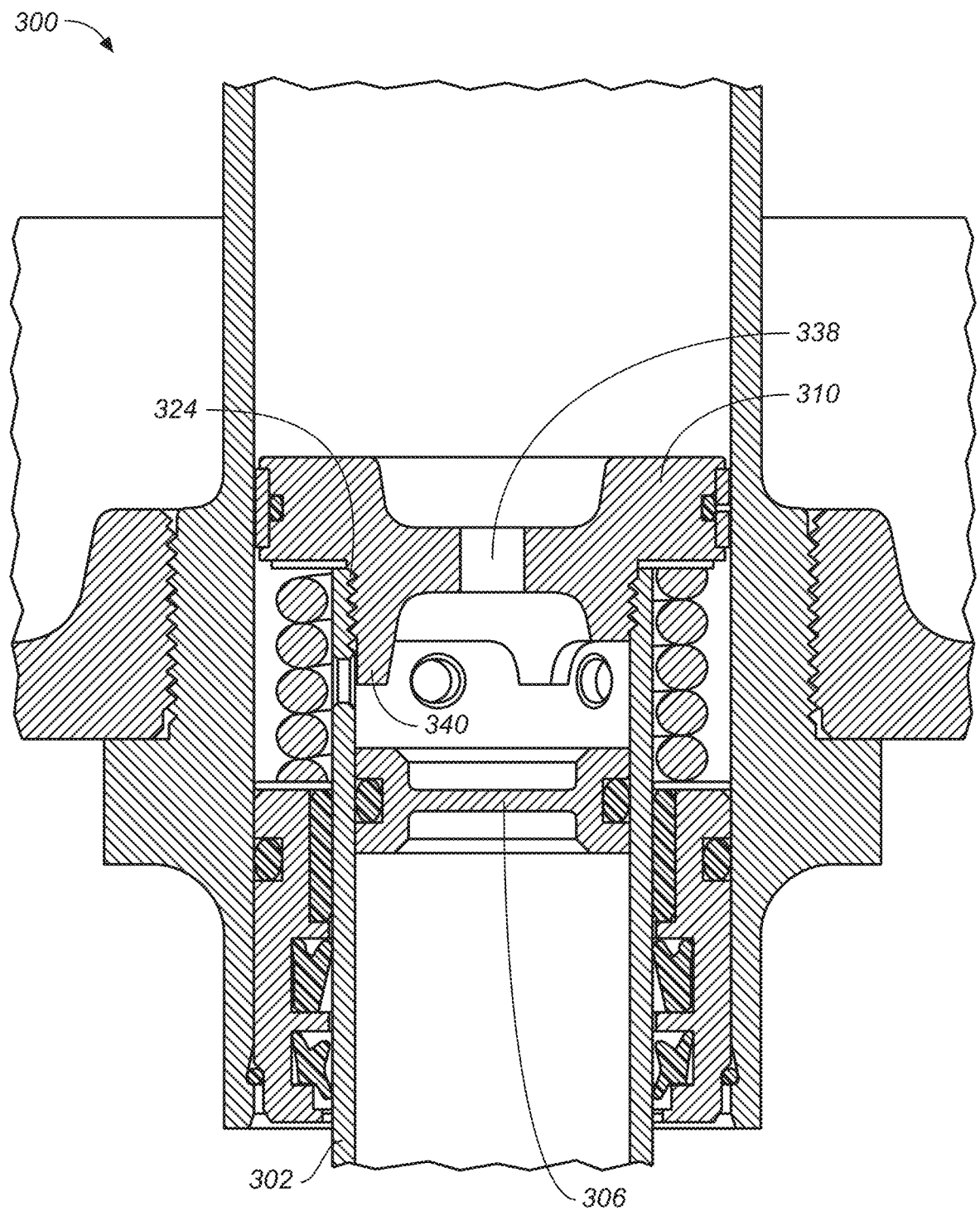
FIG. 3 shows a cross section view of a hydraulic jounce bumper with no shims.

FIG. 3 shows a cross section view of a hydraulic jounce bumper 300 with no shims. Instead, in this embodiment piston 310 has a central orifice 338. Without the use of compression shims, this embodiment instead generates the damping force through the orifice.

In this embodiment, piston 310 has external threads 324 to connect to shaft 302. Due to the lack of check shims, this design of piston 310 is simpler to produce and implement. As there is no longer shoulder screw 220 to hold check shims and act as a stopper to the internal floating piston, the embodiment of FIG. 3 instead extends piston 310 such that stopper 340 prevents internal floating piston 306 from going farther than intended. This new structure also allows for a simpler design for internal floating piston 306.

The embodiment of FIG. 3 also has the same benefits discussed of the embodiments found in at least FIG. 1, such as a decrease in dead length, longer travel for the internal floating piston, and overall increase in efficiency.

While discussed in the context of a HJB, the listed improvements of the above embodiments are universal enough to be used in other applications. For example, components of the present invention may be used in a shock absorber.

The foregoing Description of Embodiments is not intended to be exhaustive or to limit the embodiments to the precise form described. Instead, example embodiments in this Description of Embodiments have been presented in order to enable persons of skill in the art to make and use embodiments of the described subject matter. Moreover, various embodiments have been described in various combinations. However, any two or more embodiments can be combined. Although some embodiments have been described in a language specific to structural features and/or methodological acts, it is to be understood that the subject matter defined in the appended claims is not necessarily limited to the specific features or acts described above. Rather, the specific features and acts described above are disclosed by way of illustration and as example forms of implementing the claims and their equivalents.

What is claimed is:

1. A hydraulic jounce bouncer comprising:
    a damper body;
    a shaft telescopically engaged with said damper body;
    a piston slidably disposed within said damper body and threadedly coupled to a first end of said shaft, wherein said piston has at least one compression port therethrough;
    a negative spring disposed between said shaft and said damper body; and
    an internal floating piston disposed within said shaft.

2. The hydraulic jounce bouncer of claim 1 wherein, said at least one compression port has a compression shim to restrict flow through the at least one compression port during a rebound stroke.

3. The hydraulic jounce bouncer of claim 1 further comprising:
    at least one rebound port.

4. The hydraulic jounce bouncer of claim 3 wherein, said at least one rebound port has a check shim to restrict flow through the at least one rebound port during a compression stroke.

5. The hydraulic jounce bouncer of claim 1 further comprising:
a bottom bumper disposed at a second end of said shaft.

6. The hydraulic jounce bouncer of claim 1 further comprising:
at least one oil fill fluidly coupled to an interior of said shaft or said damper body.

7. The hydraulic jounce bouncer of claim 1 wherein, said shaft has at least one shaft port to fluidly connect a rebound chamber to the interior of said shaft.

8. A hydraulic jounce bouncer comprising:
a damper body;
a shaft telescopically engaged with said damper body;
a piston slidably disposed within said damper body and threadedly coupled to a first end of said shaft, wherein said piston has at least one compression port therethrough, wherein said at least one compression port has a compression shim to restrict flow through the at least one compression port during a rebound stroke, wherein said piston has at least one rebound port;
a negative spring disposed between said shaft and said damper body; and
an internal floating piston disposed within said shaft.

9. The hydraulic jounce bouncer of claim 8 wherein, said at least one rebound port has a check shim to restrict flow through the at least one rebound port during a compression stroke.

10. The hydraulic jounce bouncer of claim 8 further comprising:
a bottom bumper disposed at a second end of said shaft.

11. The hydraulic jounce bouncer of claim 8 further comprising:
at least one oil fill fluidly coupled to an interior of said shaft or said damper body.

12. The hydraulic jounce bouncer of claim 8 wherein, said shaft has at least one shaft port to fluidly connect a rebound chamber to the interior of said shaft.

13. A hydraulic jounce bouncer comprising:
a damper body;
a shaft telescopically engaged with said damper body;
a piston slidably disposed within said damper body and threadedly coupled to a first end of said shaft, wherein said piston has at least one compression port therethrough, wherein said at least one compression port has a compression shim to restrict flow through the at least one compression port during a rebound stroke, wherein said piston has at least one rebound port;
an internal floating piston disposed within said shaft; and
a negative spring disposed between said shaft and said damper body.

14. The hydraulic jounce bouncer of claim 13 wherein, said at least one rebound port has a check shim to restrict flow through the at least one rebound port during a compression stroke.

15. The hydraulic jounce bouncer of claim 13 further comprising:
a bottom bumper disposed at a second end of said shaft.

16. The hydraulic jounce bouncer of claim 13 further comprising:
at least one oil fill fluidly coupled to an interior of said shaft or said damper body.

17. The hydraulic jounce bouncer of claim 13 wherein, said shaft has at least one shaft port to fluidly connect a rebound chamber to the interior of said shaft.

* * * * *